United States Patent Office 2,973,331
Patented Feb. 28, 1961

2,973,331

FORMING ALKYD RESINS BY THE INCREMENTAL ADDITION OF THE MONOBASIC ACID

William M. Kraft, Verona, N.J., assignor to Heyden Newport Chemical Corporation, New York, N.Y., a corporation of Delaware No Drawing. Filed Feb. 1, 1957, Ser. No. 637,625

20 Claims. (Cl. 260—22)

The present invention relates to a novel method of producing polymeric polyesters, to the novel polymeric resins so produced, and to the novel use of such polymeric materials to obtain new and improved results and compositions.

It has been known that polyhydric alcohols and polybasic acids, for example glycerol and phthalic acid, could be reacted to form resinous reaction products, commonly referred to as "alkyd resins." In such a reaction both esterification as well as polymerization and/or condensation reactions are involved. While the term "alkyd resin" is particularly used in connection with such products which are solid or highly viscous, the term "alkyd resin" is not limited to products which are viscous or solid but broadly includes such products which are polymeric polyesters of polyhydric alcohols and polybasic acids which may or may not be modified with other constituents. Oils, particularly the drying and semi-drying oils have been used to modify the alkyd resins. Monobasic acids including the higher fatty acids as well as aromatic acids also have been used to modify the alkyd resins. The procedure followed in modifying an alkyd resin with oil is quite different from that used when monobasic acid is the modifier. The oils are triglycerides, that is glycerol fully esterified with the higher fatty acids, and it is necessary to effect an alcoholysis reaction which is essentially a transesterification reaction between the oil and the polyhydric alcohol prior to reaction with the dibasic acid. In contrast, when one or more monobasic acids are used there is competition between the monobasic and polybasic acids in esterifying the polyhydric alcohol and in order to prevent undesirable gelation all of the monobasic acid is reacted with the polyhydric alcohol prior to or simultaneously with the polybasic acid.

It has now been discovered that when monobasic acid-modified alkyd resins are produced in accordance with a novel, essentially two step process, the resulting novel product exhibits unusual and unexpected properties and may be used for a number of purposes to achieve unexpected results. In general, the present novel process involves first reacting all of the polyhydric alcohol with all of the polybasic acid and only part of the monobasic acid and carrying this initial reaction substantially to completion which is indicated by the low acid number of the initial polymeric reaction product. This initial product is thereafter reacted with the remainder of the monobasic acid until the resulting final reaction product has a low acid number. The polymeric polyester, alkyd resin, produced in this manner differs materially from the alkyd resins produced in a customary manner from the same ingredients in the same proportions and can be used for the purposes alkyd resins have been used in the past as well as for new purposes to achieve novel results.

While not limited to any particular theory it is believed, and there is considerable support for such belief, that the present process results in an alkyd resin which is, or more nearly is a linear intermolecular ester as distinguished from products resulting from the prior processes which are or contain a relatively higher percentage of intramolecular esters. Thus, with pentaerythritol and phthalic acid the intramolecular ester might be, although it is readily apparent that other intramolecular esters might be and probably are formed:

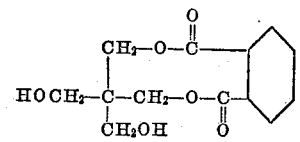

In contradistinction, a linear intermolecular polymer would be:

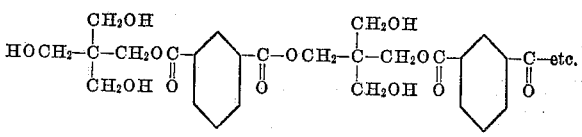

The dibasic acid instead of acting solely as a link in a single polyester chain or polymer as indicated above also serves to cross link two or more chains which in turn can lead to gelation before all of the acid has been reacted, in other words, gelation may occur before a low acid number is obtained. This present process reduces this cross linking and the tendency toward the formation of intramolecular esters. Regardless of whether or not this is the correct or only explanation, the product of the present process is different. While the particular advantages and novel aspects of present alkyd resins will be more fully hereinafter pointed out, the present alkyd resins, in general, have a higher viscosity, dry more quickly, form films having greater flexibility and which are more resistant to alkali and detergents, and are compatible with more other materials than alkyd resins produced from the same materials by the prior art processes.

As used herein and unless indicated otherwise, the term "alkyd resin" includes the polymeric polyester of a polybasic acid and a polyhydric alcohol, that is, the resinous reaction product of these reactants which may be in the solid, liquid or viscous state. As the present invention is concerned with alkyd resins modified with monobasic acid and for the sake of brevity, the term "modified alkyd resin" is used to designate alkyd resins modified with monobasic acid unless stated differently.

The particular properties of any particular, modified alkyd resin of the present invention depend on many factors including the relative amounts of monobasic acid employed in the first reaction and the second reaction; the particular ingredients including the polyhydric alcohol, the polybasic acid and the monobasic acid used; the proportions used and to a limited extent the reaction conditions. The influence of these variations will be discussed more fully but it is to be understood the present technique can be applied broadly to the production of alkyd resins from the appropriate ingredients used heretofore and known in the art.

The polyol, that is the polyhydric alcohol, may be any one or a mixture of the polyols used in the past providing the polyol has the required functionality, that is the minimum number of hydroxyl (OH) groups. The polyhydric alcohol must have a minimum functionality of 2.3 and preferably a functionality of 2.5 and higher. By functionality of the polyol is meant the average number of hydroxyl groups per average mole of the alcohol. Thus, pentaerythritol has a functionality of 4. A mixture of polyhydric alcohols may be used and, for example, a mixture of one mole of pentaerythritol and one mole of glycol has an average hydroxyl equivalent of a trihydric alcohol or 3. The average hydroxyl equivalent of a mixture of polyols may be determined by totalling the number of moles of hydroxyl groups in all the alcohols of the mixture and dividing this total by the total number of moles of polyol. For example, the hydroxyl equivalent of a mixture of 0.5 mole of pentaerythritol and 2.5 moles of trimethylolethane can be determined as follows:

$$\frac{(0.5 \times 4)+(2.5 \times 3)}{0.5+2.5} \text{ or } \frac{9.5}{3}$$

= 3.16, average hydroxyl equivalent per mole of polyhydric alcohol

The preferred polyhydric alcohols are those containing three or more hydroxyl groups and these alcohols may be primary or seconday aliphatic alcohols or aromatic aliphatic alcohols or alicyclic alcohols. Exemplary triols and higher polyols are glycerol, trimethylolethane, trimethylolpropane, trimethylolbutane, hexanetriol, butanetriol, pentaerythritol, polypentaerythritol including dipentaerythritol and tripentaerythritol, diglycerol, tetramethylol cyclohexanol, sorbitol, mannitol, inositol, methyl $\alpha$-glucoside, trimethylolphenyl methane, phenylethylene, glycol, trihydroxymethyl aminomethane. The primary aliphatic and aryl substituted aliphatic diols may be mixed with these triols or higher polyols to form a mixture having a hydroxyl equivalent of at least 2.3 and preferably of at least 2.5. These diols include for example, ethylene glycol, propylene glycol, butylene glycol, diethylene glycol, xylylene diglycol and the like. In general, best results are obtained with polyols containing at least 2 and preferably all primary alcohol or methylol groups, a methylol group being —CH$_2$OH. The polybasic acids heretofore utilized in the alkyd resin field may be used in accordance with present invention. The polybasic acids used most extensively in the present instance are the saturated or unsaturated aliphatic and alicyclic acids, and aromatic acids, for example, succinic, oxalic, glutaric, adipic and sebacic acids as well as rosin dimer acids, dimerized fatty acids, phthalic acid, and isophthalic, terephthalic, tetrahydrophthalic and hexahydrophthalic acids. Tribasic and higher polybasic acids may be used, for example, citric acid, butane tetracarboxylic acid, and benzene tricarboxylic acid may be used. Mixtures as well as the anhydrides of these acids may be used. As used herein the term "polybasic acid" includes a carboxylic acid containing two or more carboxyl groups and the anhydrides of such polycarboxylic acids.

The monobasic acid may be any monocarboxylic acid or its anhydride with the preferred acid or mixture depending upon the particular characteristics desired. An aliphatic straight or branched chain acid, either saturated or unsaturated, containing 4 to 22 carbon atoms, or a cycloaliphatic acid, or an aromatic acid containing a substituted or non-substituted benzene ring may be used. Exemplary acids include the aliphatic acids, butyric acid, caproic acid, lauric acid, stearic acid, acrylic acid, methacrylic acid, crotonic acid, sorbic acid, oleic acid, linoleic acid, linolinic acid, eleostearic acid, rosin acids including abietic acid, as well as the aromatic acids including benzoic acid, salicyclic acid, toluic acid, chlorobenzoic acid, and p-t-butyl benzoic acid. Also the naturally occurring acids may be used such as the mixed fatty acids of soybean oil, linseed oil, menhadden oil and tall oil as well as any of the acids present in such mixtures. Mixtures of the aforesaid monobasic acids may be used.

The three components, namely the polyhydric alcohol, the dibasic acid and the monobasic, may be used in widely varying proportions depending to a certain extent upon the properties desired and the particular materials used. In discussing the proportions it is to be understood that the proportions are based on molar proportions and are expressed as moles of polybasic or monobasic acid per mole of polyol. In describing the relative amounts of material reacted it is considered that all the acids enter into the esterification reaction and that at least part of the polyhydric alcohol is completely esterified. This amount of alcohol, which is regarded as completely esterified, is the stoichiometric amount required for completely reacting with all of the acid. The polyhydric alcohol in excess of this amount actually reacts, however for purposes of calculation, it is considered as not reacting and being an "excess." Customarily some excess polyol is used and is desirable in most but not all instances. The amount of excess polyol may vary from 0–50% and in most instances will be in the range of 0–30% based on the total amount of polyol used. For some purposes it is desirable to have no excess polyol and for some purposes, for example when the polyester is used as a plasticizer, it is desirable to have a small excess of acid, up to about 5% based on the stoichiometric amount of total acid required for esterification. Thus, the total amount of acids may be in the range of from 50% less to 5% more than the stoichiometric amount required to completely esterify the polyol.

The optimum mole ratio of polybasic acid to polyhydric alcohol depends to a certain extent on the polyhydric alcohol used but to a greater extent on the polybasic acid used. In this connection the use of dibasic acids will be discussed in greater detail but it is to be understood that smaller amounts of a polybasic acid of greater functionality would be used in smaller amounts inversely proportional to its functionality greater than two. For example, 50% less tribasic acid would be used compared to a dibasic acid. The amount of dibasic acid required per mole of polyhydric alcohol is in excess of 0.5 mole of acid per mole. Similarly, more than 0.33 mole of tribasic acid would be required per mole of polyol. In other words, the amount of polybasic acid should be in excess of the reciprocal of the functionality of the acid. For practical reasons at least 0.6 mole and not more than 2 moles of dibasic acid is used per mole of polyhydric alcohol. However, the preferred and optimum mole ratios will vary to a certain extent as will be subsequently discussed.

The amount of monobasic acid per mole of polyol depends on the functionality of the polyhydric alcohol and amount and functionality of the polybasic acid. The total molal amount of monobasic and polybasic acid should not be more than 5% in excess of the stoichiometric amount required to esterify all of the hydroxyl groups of the polyol. In general, at least a total of .15 mole and not more than 6.5 moles of monobasic acid are used per mole of polyol.

As previously pointed out, an essential feature of the present invention is that all of the polyol and polybasic acid are first reacted along with part of the monobasic acid to a low acid number and then this reaction product is reacted with the remainder of the monobasic acid to a low acid number. To achieve the desired results, 20–90% of the total amount of monobasic acid is used in the first reaction and the remainder, 10–80% of the monobasic acid is used in the second reaction. Preferably 40–80% of the monobasic acid used during the first reaction although, for some purposes the use of 30% and 70% for the first and second reactions respectively produces very good results. On a molal basis, at least 0.2 and preferably at least 0.3 mole of monobasic acid are used in both reactions and at least 0.1 and preferably at least 0.15 mole of monobasic acid is used in each of the first and second reactions. Up to about 6.5 moles of monobasic acid may be used in both reactions when a higher polyol, for example, tripentaerythritol is used.

The maximum and minimum molal ratio range as well as preferred molar ratio range and the optimum molar ratio of dibasic acid and certain polyols are set forth in the following table. The term "others" as used in the table designates dibasic acids other than phthalic acid and includes, for example, adipic and isophthalic acids. All ratios are expressed as mole of acid per one mole of polyhydric alcohol. The same mole ratios as described for phthalic acid would be used for nuclear substituted phthalic acid including hexahydrophthalic acid and tetrahydrophthalic acid.

TABLE

| Alcohol | Dibasic Acid | Mole Ratio of Dibasic Acid per Mole of Polyol | | |
|---|---|---|---|---|
| | | Maximum Range | Preferred Range | Optimum |
| Trimethylolethane | phthalic | 0.6–1.2 | 0.8–1.08 | 1.0 |
| Do | others | 0.6–1.0 | 0.75–0.9 | 0.85 |
| Trimethylolpropane | phthalic | 0.6–1.2 | 0.8–1.08 | 1.0 |
| Do | others | 0.6–1.0 | 0.75–0.9 | 0.85 |
| Glycerol | phthalic | 0.6–1.2 | 0.8–1.08 | 1.0 |
| Do | others | 0.6–1.0 | 0.75–0.9 | 0.85 |
| Pentaerythritol | phthalic | 0.6–1.2 | 0.75–1.15 | 1.04 |
| Do | others | 0.6–1.0 | 0.75–0.9 | 0.85 |
| Dipentaerythritol | phthalic | 0.6–1.6 | 0.7–1.50 | 1.4 |
| Do | others | 0.6–1.0 | 0.75–0.9 | 0.85 |
| Tripentaerythritol | phthalic | 0.6–1.7 | 0.7–1.6 | 1.5 |
| Do | others | 0.6–1.0 | 0.75–0.9 | 0.85 |

From the above table it can be seen that in general somewhat more phthalic acid is preferred than is preferred for the other acids with approximately a ratio of one mole of dibasic acid per mole of polyhydric alcohol being the optimum ratio in most instances. For the optimum ratios of moles of dibasic acid to moles of polyol set forth in the preceding table, the preferred minimum moles of monobasic acid per mole of polyol for the first reaction varies from 0.2 to 2.8 moles. For trimethylolethane or trimethylolpropane with phthalic acid at the 1.0/1.0 mole ratio, there is preferably used at least 0.2 mole of monobasic acid during the first reaction whereas, when these polyols are used with other dibasic acids at the 0.85/1.0 mole ratio, there is preferably used at least 0.3 mole of monobasic acid per mole of polyol. For glycerol, pentaerythritol, dipentaerythritol or tripentaerythritol at the optimum mole ratio of polyol to dibasic acid as set forth above, the preferred minimum molal amounts of monobasic acid per mole of polyol used in the first reaction are 0.3, 0.8, 1.6 and 2.8 moles, respectively. However, excellent results can be obtained with pentaerythritol, dipentaerythritol or tripentaerythritol using 0.5, 1.2 or 2.4 moles of monobasic acid, respectively during the first reaction and improved results can be obtained with all the above mentioned polyols using at little as 0.1 mole but preferably 0.15 mole of monobasic acid per mole of polyol in the first reaction. Larger quantities of monobasic acid may be used with the maximum being about 90% of the number of moles of monobasic acid required with the dibasic acid to completely esterify the polyol.

The present process involves first reacting the polyol, the polybasic acid and part of the monobasic acid to a low acid number followed by reacting this resinous reaction product with the remainder of the monobasic acid to a low acid number. Heating is required to effect the esterification and condensation reactions involved. For the sake of brevity, this first reaction will be referred to as "first cook" and the second reaction will be referred to as "second cook." The temperatures involved during the first and second cooks do have some effect on the characteristics of the final product but the important and primary condition is that sufficient heating be effected to cause the reaction to take place and the lowering of the acid number to the desired value. Water is formed during both cooks and the temperature should be high enough to drive off the water. The temperature will be above 150° C. and a temperature in the range of about 180–290° C. is normally used during the first cook. Usually a somewhat higher temperature is used during the second cook than the first cook and this temperature may be in the range of 190–300° C. The upper temperature should not be high enough to cause undue degradation or discoloration. The temperatures involved are those temperatures customarily involved in the production of alkyd resins and which have been considered and disclosed by those skilled in the alkyd resin art.

It is essential that a low acid number be reached in each of the first and second cooks to obtain the results and advantages of the present invention. The acid number is the number of milligrams of potassium hydroxide necessary to neutralize the free acid in one gram of the resin. In the first cook the acid number is reduced to less than 20 and usually it is preferable to reduce the acid number to less than 10. In the second cook the acid number is reduced to less than 15, and normally it is preferable to reduce the acid number to less than 10. The low acid number shows that in each cook the reactions are substantially complete as there is no substantial amount of unreacted carboxyl groups. The second cook should be interrupted before gelation takes place. The first cook is interrupted before any substantial gelation occurs and preferably before any gelation occurs. However, one advantage of the present invention is that if some gelation occurs during the first cook, the particles of gel are redissolved during the second cook, apparently by rearrangement of the molecules so that an end product free of gelation can be obtained. Gelation is the formation of a gel which is a reaction product insoluble in alkyd resin solvents such as toluene. The minimum acid number during the first cook is the lowest acid number at which there is no substantial gelation and preferably is the lowest acid number at which there is no gelation. Thus, in order to obtain the important advantages of the present invention, the first cook is carried to an acid number below 20 without substantial gelation and preferably to an acid number below 10 without substantial gelation. The second cook is carried to an acid number below 15 and preferably below 10 without gelation.

In the following examples all parts and percentages are by weight unless stated differently. The viscosities of the alkyd resins were determined, in most instances, by dissolving the alkyd being tested in a solvent to form a solution containing the stated percent by weight of resin and then determining the viscosity of this solution as most of the resins were either solid or too viscous for testing. For example, the expression "60% in xylol" refers to the fact that the solution contained 60% resin and 40% xylol. Viscosity was determined in accordance with the Gardner Holdt procedure using a Gardner bubble viscometer. Briefly stated, this procedure involves placing the solution in a tube and determining the speed at which an air bubble travels up through the solution. The higher letters in the alphabet indicate the higher viscosities and vice-versa. This procedure is more fully described in various texts including "Stewart's Scientific Dictionary," 4th edition, published by Stewart Research Laboratory, Alexandria, Virginia.

Drying time was determined by casting onto a glass plate a film of the solution used for the viscosity determination usually catalyzed by the addition of driers and noting the time required to dry to the "set to touch condition" or to the "tack free condition." The hardness of the dried films was determined with a Sward hardness rocker and the results are expressed in terms of percentage of the hardness of glass, the latter being considered as 100%; for example, if 50 oscillations were required for glass and 13 oscillations were required to mark the dried film, then the hardness of the film is expressed as 26.

The Sward hardness rocker and its use are described in "Physical and Chemical Examination of Paints, Varnishes, Lacquers and Colors," H. A. Gardner and G. G. Sward, 10th edition, May 1946, distributed by Henry A. Gardner Laboratory, Inc.

The alkali resistance was determined by immersing the dried film cast on a one inch diameter test tube in a 3% aqueous solution of sodium hydroxide and the time noted when the first noticeable effect or attack appeared, and also when the film was completely destroyed. In all of the comparative examples, the tests were carried out under similar conditions and the results are comparable. However, in a few instances as noted, the solutions of the alkyd was made up to contain a percentage of solids other than 60%. Obviously, a 70% solution will have a higher viscosity than a 60% solution and this is a factor in interpreting the results.

In most of the examples involving pentaerythritol, the pentaerythritol used was a technical grade containing a small amount, about 8–10%, of dipentaerythritol and it had an average molecular weight of 145. The mixed fatty acids of soy bean oil had an iodine value of 124 and a minimum acid value of 196. Their average molecular weight was 280–283. These molecular weights were used in determining the proportions and the number of moles. The water resistance was determined by immersing the dried film in hot or cold water and then measuring the time required (if any) for the film to become clear.

*Example 1*

In this example the properties of an alkyd resin prepared by a standard procedure are compared with those of an alkyd resin prepared in accordance with the present invention. The resin is, in each instance, a phthalic anhydride- pentaerythritol-soy bean oil fatty acids alkyd resin and is of the type customarily referred to as a long oil alkyd resin in view of the relatively high fatty acid content.

First a resin was prepared from the following ingredients:

Soy bean oil fatty acids _____ 586 parts (2 moles).
Pentaerythritol (technical) ____ 198 parts (1.37 moles).
Phthalic anhydride _____ 216 parts (1.45 moles).

All of these ingredients were charged to a resin kettle and heated with stirring to 230° C. Cooking was continued at 230° C. until the acid number was somewhat less than 10. The resulting alkyd resin is hereinafter designated resin A–1.

A second alkyd resin (A–2) was prepared using the same total amounts of the same ingredients in accordance with the present invention. This second resin was prepared by heating 198 parts (1.37 moles) of pentaerythritol, 216 parts (1.45 moles) of phthalic anhydride and 410 parts (1.4 moles) of soy bean oil fatty acids with stirring to 230° C. and continuing the heating at this temperature until the product had substantially the same acid number below 10. Thereafter, this product of the first cook was mixed with 176 parts (0.6 mole) of soy bean oil fatty acids and heated at 230° C. until the product had an acid number below 10 substantially the same as that of resin A–1. In preparing resin A–2, 70% of the monobasic acid was used in the first cook and 30% in the second cook.

Each of the resins was dissolved in mineral spirits to form a 60% solution (60% resin, 40% mineral spirits) and this solution used to determine the viscosity (Gardner Holdt) and color (Gardner). Drier was added to the solution before determining the film properties. The quantity of drier used contained 0.3% Pb and 0.03% Co based on the amount of resin. The properties of these two resins are set forth in the following table in which time is expressed in hours: minutes.

TABLE

| | Resin A–1 | Resin A–2 |
|---|---|---|
| Total cook time at 230° C. | 4:10 | 5:00. |
| Viscosity | N | Z. |
| Color | 4+ | 4. |
| Air Dried Film: | | |
| Set to touch | 1:20 | 0:15. |
| Tack free | 3:10 | 1:10. |
| Sward Hardness— | | |
| After 1 day | 10 | 10. |
| After 7 days | 12 | 16. |
| After 28 days | 14 | 20. |
| Resistance: | | |
| Water, hot | Immediate | 0:05. |
| Water, cold | 0:25 | 0:25. |
| 3% NaOH: | | |
| First attack | 0:18 | 0:18. |
| Denude | 2 days | 8 days. |
| 1% Detergent: | | |
| First attack | 0:18 | 1:18. |
| Denude | 1 day | 4 days. |

*Example 2*

In this particular instance, the primary purpose was to obtain a long oil type alkyd resin that would dry overnight at 62–66° F. and that utilized the relatively inexpensive mixed fatty acids obtained from tall oil. These acids normally do not produce alkyd resins having as good drying properties as do the acids of soy bean oil.

First, there was mixed in a resin kettle equipped with reflux condenser, 347 parts of tall oil fatty acids, 205 parts of pentaerythritol and 217 parts of phthalic anhydride. Mineral spirits were included in the kettle as reflux solvent. The mixture was heated with stirring to 230° C. and held at this temperature until an acid number of 7 was reached. Then 231 parts of tall oil fatty acids were added and the mixture held at 230° C. until the product had an acid number of 7. This resin made by using 60% of the monobasic acid in the first cook and 40% of the monobasic acid in the second cook had a viscosity of V–Y at 50% resin in mineral spirits. A film of this resin solution met the requirements for drying and dried similarly to a control alkyd resin utilizing soy bean oil fatty acids and prepared by the complete addition technique. A similar tall oil fatty acid resin prepared by the complete addition method did not meet the drying requirements even when the customary 0.5 Pb—0.05 Co driers were added.

By the present partial addition procedure it is possible to prepare an alkyd resin from tall oil fatty acids which has drying properties equal to those of an alkyd resin prepared from the more expensive soy bean oil fatty acids.

*Example 3*

A series of alkyd resins were made, and like those series of resins prepared and described in the following illustrative examples, each resin contained the same total amount of polyol, polybasic acid and monobasic acid, the difference in preparation being variations in the amounts of monobasic acid added for the first and second cooks, respectively. In one instance in this series, 70% of the monobasic acid was added during the first cook and the remainder, or 30%, of the monobasic acid was added for the second cook. This procedure will be referred to as the 70/30 partial addition technique. This and similar expressions will be used hereinafter for the sake of brevity and the first figure is the percentage of the monobasic acid used in the first cook and the second figure is the percentage of the monobasic acid used in the second cook. In all cases the total of these two figures will be 100%.

Each of the resins in this series contained the following materials in the specified molal amounts:

Trimethylolethane _____ 121 g. (1.0 mole).
Phthalic anhydride _____ 154 g. (1.04 moles).
Soy bean oil fatty acids _____ 216 g. (0.76 mole).

This formulation contains about 6% excess polyol based on the stoichiometric amount of polyol required for esterification by the acid. The 1.04 moles of dibasic acid is equivalent to 2.08 moles of monobasic acid making a total of 2.84 moles (2.08+0.76) of monobasic acid which stoichiometrically requires 2.84 moles of methylol groups. The trimethylolethane being a trihydric alcohol contains 3 moles of hydroxyl radicals or 0.16 mole in excess of the stoichiometric amount which is 6% of 2.84 moles.

The alkyd resins were prepared by placing all of the trimethylolethane and all of the phthalic anhydride in a resin kettle along with a portion of the fatty acid. The kettle and contents were heated to 245° C. and held at this temperature until the resinous reaction product had the hereinafter indicated acid number. Then the remainder of the monobasic acid was added and then heated to 245° C. and held at this temperature until the indicated acid number was reached. These resin cooks like the others hereinafter set forth are solvent type cooks wherein a solvent is used and the kettle is equipped with a reflux condenser. For the sake of brevity the temperatures of the first cook and second cook will hereinafter be referred to, it being understood that in each instance this is the temperature at which the ingredients are held until the acid number is lowered to the desired value. In the present series of resins, the resin prepared by adding all (100%) of the monobasic acid to the first cook was not subjected to a second cook. The viscosity and film properties were determined on a 70% solution in xylol.

| Resin No. | Monobasic Acid, percent | | Acid No. | | Viscosity, 70% xylol |
|---|---|---|---|---|---|
| | 1st Cook | 2nd Cook | 1st Cook | 2nd Cook | |
| C | 100 | | 10 | | W |
| C-1 | 70 | 30 | 11 | 10 | Z3 |
| C-2 | 60 | 40 | 10 | 10 | Z4 |
| C-3 | 50 | 50 | 10 | 20 | Z6 |

| | Resins | | | |
|---|---|---|---|---|
| | C | C-1 | C-2 | C-3 |
| Air Dried (Drier 0.05% Co+0.5% Pb): | | | | |
| Set to Touch | 0:05 | 0:05 | 0:05 | 0:05 |
| Tack Free | 1:45 | :55 | 1:05 | 1:05 |
| Hardness 1 day | 12 | 14 | 12 | 14 |
| Hardness 7 days | 18 | 22 | 20 | 20 |
| Hardness 28 days | 24 | 28 | 28 | 24 |
| H₂O Resistance, Hot | 0:30 | 0:15 | 0:20 | 0:05 |
| H₂O Resistance, Cold | 0:50 | 1:00 | 0:50 | 1:10 |
| 3% NaOH 1st Attack | 0:15 | 0:15 | 0:15 | 0:15 |
| 3% NaOH Denude | 1d | 8d | 8d | >28d |
| 1% Detergent 1st Attack | 1:00 | 1:00 | 1:00 | 0:45 |
| 1% Detergent Denude | 5d | 11d | >28d | 18d |
| Baked (150° C. ½ Hr. Drier 0.02 Mn): | | | | |
| Hardness | 40 | 56 | 44 | 54 |
| H₂O Resistance, Hot | 1:15 | 1:15 | 1:15 | 0:25 |
| H₂O Resistance, Cold | 0:55 | 0:55 | 0:55 | 0:20 |
| 3% NaOH 1st Attack | 6 | 3 | 6 | 6 |
| 3% NaOH Denude | 8d | >28d | >28d | 17d |
| 1% Detergent 1st Attack | 4:00 | 3:00 | 3:00 | 3:00 |
| 1% Detergent Denude | >28d | >28d | >28d | >28d |
| Baked (150° C. 1 Hr. Drier none): | | | | |
| Hardness | 18 | 20 | 18 | 32 |
| H₂O Resistance, hot | 0:05 | 0:40 | 0:40 | 0:15 |
| H₂O Resistance, cold | 0:20 | 0:20 | 0:15 | 0:15 |
| 3% NaOH 1st Attack | 1:00 | 1:00 | 1:00 | 0:15 |
| 3% NaOH Denude | 14d | >28d | >28d | 22d |
| 1% Detergent 1st Attack | 0:15 | 0:15 | 0:15 | 0:15 |
| 1% Detergent Denude | >28d | >28d | >28d | >28d |

Note.—"d"=day.

*Example 4*

This series of alkyd resins were prepared with each resin containing the following total amounts of ingredients:

Trimethylolethane _____ 121 g. (1 mole).
Tall oil fatty acids _____ 170 g. (0.59 mole).
Phthalic anhydride _____ 148 g. (1 mole).

The temperature of each cook was 245° C. One resin was prepared where all of the above ingredients were mixed and cooked. There was of course no second cook for this 100% addition of the monobasic acid. Resins also were prepared in which 90%, 80%, 70% and 60% of the monobasic acid was used, respectively, for the first cook with the remainder of the monobasic acid being added in each instance prior to the second cook. There was no gelation during any of the cooking procedures. The viscosity and film properties were determined on a 60% solution in xylol.

| Resin No. | Monobasic Acid, percent | | Acid No. | | Viscosity, 60% xylol |
|---|---|---|---|---|---|
| | 1st Cook | 2nd Cook | 1st Cook | 2nd Cook | |
| D | 100 | | 8.0 | | S |
| D-1 | 90 | 10 | 8.7 | 8.7 | U+ |
| D-2 | 80 | 20 | 8.5 | 8.5 | X+ |
| D-3 | 70 | 30 | 11.0 | 11.0 | X+ |
| D-4 | 60 | 40 | 11.6 | 11.6 | U |

| | Resins | | | | |
|---|---|---|---|---|---|
| | D | D-1 | D-2 | D-3 | D-40 |
| Air Dried (Drier 0.05% Co+0.5% Pb): | | | | | |
| Set to Touch | >0:05 | >0:05 | >0:05 | >0:05 | >0:05 |
| Tack Free | 4:00 | 2:30 | 2:30 | 2:30 | 2:30 |
| Hardness 1 day | 10 | 14 | 10 | 14 | 14 |
| Hardness 7 days | 22 | 24 | 20 | 24 | 24 |
| Hardness 28 days | 42 | 40 | 38 | 40 | 40 |
| H₂O Resistance, Hot | >8:00 | >8:00 | >8:00 | >8:00 | >8:00 |
| H₂O Resistance, Cold | 1:30 | 1:30 | 1:30 | 1:30 | 1:30 |
| 3% NaOH 1st Attack | 0:15 | 0:15 | 0:15 | 0:15 | 0:15 |
| 3% NaOH Denude | 2d | 5d | 6d | 15d | 6d |
| 1% Detergent 1st Attack | 0:30 | 0:45 | 0:15 | 0:15 | 0:30 |
| 1% Detergent Denude | >28d | >28d | >28d | >28d | >28d |
| Baked (150° C. ½ Hr. Drier 0.02 Mn): | | | | | |
| Hardness | 12 | 14 | 10 | 16 | 20 |
| H₂O Resistance, Hot | 1:10 | 8:0 | 8:0 | 8:0 | 1:10 |
| H₂O Resistance, Cold | 1:30 | 1:30 | 1:30 | 1:30 | 1:30 |
| 3% NaOH 1st Attack | 0:45 | 0:45 | 0:30 | 0:30 | 0:30 |
| 3% NaOH Denude | 6d | 5d | >28d | 5d | 5d |
| 1% Detergent 1st Attack | 0:45 | 0:45 | 0:30 | 0:30 | 0:30 |
| 1% Detergent Denude | >28d | >28d | >28d | >28d | >28d |
| Baked (150° C. 1 Hr. Drier none): | | | | | |
| Hardness | 8 | 10 | 8 | 8 | 8 |
| H₂O Resistance, hot | 0:10 | 0:10 | 0:30 | 0:30 | 0:30 |
| H₂O Resistance, cold | 0:40 | 1:00 | 1:10 | 0:55 | 1:10 |
| 3% NaOH 1st Attack | 3:0 | 4:00 | 4:00 | 2:00 | 0:45 |
| 3% NaOH Denude | 3d | 3d | 3d | 1d | 3d |
| 1% Detergent 1st Attack | 2:00 | 4:00 | 3:00 | 1:00 | 3:00 |
| 1% Detergent Denude | >28d | >28d | >28d | >28d | >28d |

Of the above resins, Resins D-3 and D-4, the 80/20 and 70/30 resins have the optimum properties for most purposes.

*Example 5*

This series of resins were produced in each instance from the following materials:

Trimethylolethane _____ 121 g. (1.0 mole).
Phthalic anhydride _____ 148 g. (1.0 mole).
Tall oil fatty acids _____ 115 g. (0.4 mole).

The temperature during both cooks was about 245° C. A resin was prepared where all of the tall oil fatty acids were used in the first and only cook and others were prepared using the 80/20, 70/30, 60/40 and 50/50 partial addition technique. Viscosities and film properties were determined on 50% solutions in xylol.

| Resin No. | Monobasic Acid, percent | | Acid No. | | Viscosity 50% xylol |
|---|---|---|---|---|---|
| | 1st Cook | 2nd Cook | 1st Cook | 2nd Cook | |
| E | 100 | | 6.0 | | T |
| E-1 | 80 | 20 | 9.5 | 7.3 | R |
| E-2 | 70 | 30 | 9.0 | 7.8 | Z1 |
| E-3 | 60 | 40 | 6.5 | 9.5 | Z2 |
| E-4 | 50 | 50 | 10.5 | 14.6 | X |

| | Resins | | | | |
|---|---|---|---|---|---|
| | E | E-1 | E-2 | E-3 | E-4 |
| Air Dried (Drier 0.05% Co +0.5% Pb): | | | | | |
| Set to Touch | <:15 | <:15 | <:15 | <:15 | Not Tested |
| Tack Free | 0:50 | 0:45 | 0:45 | 0:35 | |
| Hardness 1 day | 34 | 30 | 38 | 36 | |
| Hardness 7 days | 48 | 48 | 46 | 42 | |
| Hardness 28 days | 52 | 52 | 50 | 54 | |
| H₂O Resistance, Hot | 0:10 | 0:10 | 0:10 | 0:10 | |
| H₂O Resistance, Cold | 1:00 | 1:00 | 1:00 | 1:00 | |
| 3% NaOH 1st Attack | 0:15 | 0:30 | 0:45 | 0:35 | |
| 3% NaOH Denude | 5d | 5d | 5d | 5d | |
| 1% Detergent 1st Attack | 0:15 | 0:30 | 0:45 | 0:15 | |
| 1% Detergent Denude | 23d | >28d | >28d | 3d | |
| Baked (150° C. ½ Hr. Drier 0.02 Mn): | | | | | |
| Hardness | 54 | 48 | 48 | 54 | |
| H₂O Resistance, Hot | | | | | |
| H₂O Resistance, Cold | 1:00 | 1:00 | 1:00 | 1:00 | |
| 3% NaOH 1st Attack | 1:15 | 0:45 | 0:15 | 0:45 | |
| 3% NaOH Denude | 5d | 15d | 15d | 15d | |
| 1% Detergent 1st Attack | 0:15 | 01:15 | 0:15 | 0:45 | |
| 1% Detergent Denude | >28d | >28d | >28d | >28d | |
| Baked (150° C. 1 Hr. Drier none): | | | | | |
| Hardness | 26 | 28 | 30 | 30 | |
| H₂O Resistance, hot | 0:05 | 0:05 | 1:00 | 1:00 | |
| H₂O Resistance, cold | 1:15 | 1:15 | 1:00 | 1:00 | |
| 3% NaOH 1st Attack | 1:15 | 2:45 | 2:45 | 2:45 | |
| 3% NaOH Denude | 5d | 5d | >28d | 3d | |
| 1% Detergent 1st Attack | 1:15 | 2:45 | 2:45 | 0:45 | |
| 1% Detergent Denude | >28d | >28d | >28d | >28d | |

In general, resin E-2, exhibits optimum properties. The resins prepared by the partial addition technique are especially useful in coating compositions containing isocyanate resins and also are particularly useful as plasticizers for amino resins.

*Example 6*

This series of resins contains the same molal proportions of ingredients as those of Example 5 and the materials reacted were:

Trimethylolethane _____ 121 g. (1 mole).
Phthalic anhydride _____ 148 g. (1 mole).
Lauric acid _____ 80 g. (0.4 mole).

One resin was prepared by mixing all of the materials and subjecting them to a single cooking procedure. Other resins were made by the partial addition technique. The temperature for all cooking procedures was 245° C. Viscosities were determintd by forming 50% resin solutions in xylol.

| Resin No. | Monobasic Acid, Percent | | Acid No. | | Viscosity, 50% xylol |
|---|---|---|---|---|---|
| | 1st Cook | 2nd Cook | 1st Cook | 2nd Cook | |
| F | 100 | | 7.9 | | V |
| F-1 | 80 | 20 | 9.5 | 8.3 | Y |
| F-2 | 70 | 30 | 11.0 | 9.5 | W |
| F-3 | 60 | 40 | 10.5 | 8.3 | X |

*Example 7*

This resin is especially useful as a surface active agent for increasing the solubility of other materials and, for example, to increase the compatibility of another alkyd resin, produced as in the past, with a poor solvent. A small amount, for example, 2% of the present alkyd resin will greatly increase the compatibility of another alkyd resin with a poor solvent.

The present alkyd resin, hereinafter referred to as "resin G" was prepared, by heating 121 g. (1.0 mole) of trimethylolethane, 141 g. (0.85 mole) of isophthalic acid and 229 g. of tall oil fatty acids to an acid number of 10. This product was then reacted with 86 g. of tall oil fatty acids to an acid number of 7.2. A 50% solution of this resin in mineral spirits had a viscosity of E. The total molal amount of tall oil fatty acids was 1.1 and 73% of this total amount was used in the first reaction. This resin contained only a small excess of polyol, namely 0.2 mole calculated according to the equation $$(1 \times 3) = (0.85 \times 2) - 1.1 = 0.2$$

*Example 8*

Three alkyd resins, two by the present partial addition technique, were prepared with each resin containing the following total amount of ingredients:

Trimethylolethane _____ 121 g. (1 mole).
Adipic acid _____ 117 g. (0.8 mole).
Caproic acid _____ 175 g. (1.5 moles).

One resin (resin H-1) was prepared utilizing 36% of the caproic acid in the first reaction and another resin (resin H-2) was prepared utilizing 23% of the caproic acid during the first reaction. In each instance the remainder of the caproic acid was used during the second reaction. The materials were first reacted to an acid number of 9 and then after the remainder of the caproic acid had been added this mixture was heated and reacted to an acid number of 20. The third resin (resin H) was prepared by heating and reacting all of the ingredients to an acid number of 20.

The starting materials of all three of these resins contained somewhat more total acid than the stoichiometric amount required to completely esterify the polyol and accordingly each resin contained some free acid which was removed by washing with a dilute aqueous solution of sodium hydroxide. Each of the washed resins had about the same low acid number which was considerably below 10.

*Example 9*

Two alkyd resins were prepared, one by the partial addition technique and one by the total addition technique. The materials used for each resin were as follows:

Trimethylolpropane _____ 133 g. (1.0 mole).
Adipic acid _____ 117 g. (0.8 mole).
Caproic acid _____ 175 g. (1.5 moles).

One of the resins (resin J) was prepared by reacting all of the ingredients to an acid number slightly below 10. The second resin (resin J-2) was prepared by reacting all of the trimethylolpropane and adipic acid with 59 g. (36%) of caproic acid to an acid number below 10. This reaction product was then reacted with the remainder of the caproic acid to substantially the same acid number.

Resin J-2 of this example as well as resins H-1 and H-2 of Example 8 are especially useful as plasticizers for cellulose acetate or polyvinyl chloride resins which usually are copolymers of a major amount of vinyl chloride and a minor amount of at least one other vinyl compound such as vinyl acetate. These last mentioned resins may be incorporated with, for example, a polyvinyl chloride resin by milling on hot rolls. The plasticized material will have greater resistance to migration than a similar product containing other alkyd resins including resins H or J. For use as plasticizers the preferred polyols are trimethylolethane, trimethylolpropane and pentaerythritol. The saturated, aliphatic dibasic acids are preferred as are the saturated or substantially saturated fatty acids. Preferably, the total amount of acids is substantially, within 5%, the amount required to completely esterify the polyol.

Example 10

A resin (resin K) was prepared by heating and reacting 117 g. (0.8 mole) of adipic acid, 121 g. (1 mole) of trimethylolethane and 86 g. (0.3 mole) of tall oil fatty acids to an acid number of 6.2. Then this reaction product was heated and reacted with 86 g. of tall oil fatty acids to an acid number of 4.6.

A second resin (resin K-1) was prepared by heating and reacting 133 g. (1 mole) of trimethylolpropane, 117 g. (0.8 mole) of adipic acid and 86 g. (0.3 mole) of tall oil fatty acids to an acid number of 8.9. Then this reaction product was further reacted with 86 g. (0.3 mole) of tall oil fatty acids to an acid number of 4.9. Both of these resins were viscous liquids and their viscosity was Z-4. No solvent was used in determining the viscosities.

These two alkyd resins are particularly useful in isocyanate foams and coatings and these resins are better than the 100% alkyds. Resins K and K-1 may be used in isocyanate foams to reduce the density and increase the load bearing strength of the foams so that they have greater resistance to permanent deformation under compression.

Example 11

A series of resins were made utilizing in each instance 1 mole (145 g.) of technical pentaerythritol and 1.035 moles (152 g.) of phthalic anhydride. The total amount of monobasic acid was 1.41 moles in each instance or 405 g. of tall oil fatty acids or 398 g. of soy bean oil fatty acids. Various cooking or reaction temperatures were used and the reactions were carried to different acid numbers. In the following table, resins designated L-1 through L-11 were made with tall oil fatty acids and the temperature during the first cook was 230° C. and the temperature during the second cook was 245° C. The resins L-12 through L-19 were made with tall oil fatty acids but the temperature during the first cook or reaction was 210° C. and the temperature during the second cook was 245° C. The resins L-20 through L-23 were made with soy bean oil fatty acids and the temperatures of the first and second cooks was 230° C. and 245° C. The viscosity was determined with a 50% solution of the resin in mineral solvent, respectively.

| Resin No. | Monobasic Acid, percent | | Acid No. | | Viscosity |
|---|---|---|---|---|---|
| | 1st Cook | 2nd Cook | 1st Cook | 2nd Cook | |
| L-1 | 100 | | 3.8 | | C+ |
| L-2 | 80 | 20 | 7.6 | 8.8 | E |
| L-3 | 70 | 30 | 6.7 | 8.3 | G+ |
| L-4 | 60 | 40 | 7.3 | 5.4 | L+ |
| L-5 | 50 | 50 | 12.1 | 23 | M |
| L-6 | 70 | 30 | 10 | 3.2 | G+ |
| L-7 | 70 | 30 | 15.1 | 2.9 | E+ |
| L-8 | 70 | 30 | 18.8 | 3 | E |
| L-9 | 60 | 40 | 10.8 | 5.2 | P+ |
| L-10 | 60 | 40 | 15.5 | 7.3 | M+ |
| L-11 | 60 | 40 | 19.2 | 4.1 | E+ |
| L-12 | 100 | | 3.8 | | C+ |
| L-13 | 80 | 20 | 5.8 | 6.1 | E+ |
| L-14 | 70 | 30 | 6.4 | 7.9 | K+ |
| L-15 | 60 | 40 | 5.6 | 6.9 | S+ |
| L-16 | 80 | 20 | 8.2 | 4.9 | E |
| L-17 | 70 | 30 | 8.3 | 4.7 | L+ |
| L-18 | 60 | 40 | 8.4 | 2.1 | N- |
| L-19 | 50 | 50 | 7.9 | 9.6 | U |
| L-20 | 100 | | 3.9 | | I |
| L-21 | 80 | 20 | 3.7 | 6.0 | I+ |
| L-22 | 70 | 30 | 5.3 | 9.4 | U+ |
| L-23 | 60 | 40 | 6.7 | 12.3 | Y |

Resin L-5 was on the verge of gelling and for the particular conditions involved, slightly more fatty acid should have been used. Resins L-15, L-19 and L-23 contained a small amount of seeding (small particles of gel) and although these resins were not gelled to a substantial extent, they were on the borderline.

Example 12

In this series of resins, each resin was prepared from one mole (145 g.) of technical pentaerythritol, 1.07 moles (158 g.) of phthalic anhydride, and a total of 1.41 moles of tall oil fatty acids. The temperatures of the first and second resin cooks were 230° C. and 245° C., respectively.

| Resin No. | Monobasic Acid, percent | | Acid No. | | Viscosity, 50% Mineral Spirits |
|---|---|---|---|---|---|
| | 1st Cook | 2nd Cook | 1st Cook | 2nd Cook | |
| M | 100 | | 4.4 | | H+ |
| M-1 | 80 | 20 | 7.7 | 7.4 | J |
| M-2 | 70 | 30 | 5.3 | 15.6 | W |
| M-3 | 60 | 40 | 8.9 | 19.0 | Z |

Resins M-2 and M-3 were on the point of gelation indicating that for these conditions, the amount of phthalic anhydride was at the maximum.

Example 13

Each of the resins in this series was produced from 1.0 mole of technical pentaerythritol, 1.0 mole (158.2 g.) of phthalic anhydride, and 1.41 moles of tall oil fatty acids. The temperatures of the first and second cooks were 230° C. and 245° C., respectively. There was no gelation or any indication of incipient gelation for any of the resins. Viscosities were determined with solutions of 50% resin in mineral spirits.

| Resin No. | Monobasic Acid, percent | | Acid No. | | Viscosity |
|---|---|---|---|---|---|
| | 1st Cook | 2nd Cook | 1st Cook | 2nd Cook | |
| N | 100 | | 1.3 | | B+ |
| N-1 | 80 | 20 | 2.6 | 3.8 | F |
| N-2 | 70 | 30 | 4.5 | 4.4 | F+ |
| N-3 | 60 | 40 | 2.8 | 4.5 | I+ |
| N-4 | 50 | 50 | 4.7 | 5.7 | N+ |

Example 14

These two resins were prepared by the present method and each resin was prepared from 1.0 gram mole of technical pentaerythritol, 1.0 gram mole of phthalic anhydride and 0.9 gram mole (259.4 g.) of tall oil fatty acids. In each instance 202 g. of tall oil fatty acids (78%) were used in the first cook and the remainder of the fatty acids was used in the second cook. Both cooks were carried out at 210° C. Resin O-1 was first reacted to an acid number of 10.2 and after the addition of the remainder of the tall oil fatty acids, it was reacted to an acid number of 13.9. The other resin, resin O-2, was prepared in the same manner except the acid numbers were 9.5 and 11, respectively. A 50% solution of resin O-1 in odorless mineral solvents had a viscosity of Z-5 whereas, a 50% solution of resin O-2 in regular mineral solvents had a viscosity of Z-1.

While these two resins have highly desirable properties for many purposes, they are especially useful as solubilizers for other alkyd resins and as thixotropic agents. When even a small amount of one of these resins is added to a paint, it will improve its brushability and flow properties.

Example 15

Each of these resins were prepared from the following total amounts of materials:

Pentaerythritol (technical) _____ 145 g. (1 mole).
Phthalic anhydride _____ 152 g. (1.035 moles).
Tall oil fatty acids _____ 379 g. (1.32 moles).

The reaction temperatures were 230° C. during the first cook and 245° C. during the second cook. The viscosity was measured with a 50% solution in mineral spirits.

| Resin No. | Monobasic Acid, percent | | Acid No. | | Viscosity |
|---|---|---|---|---|---|
| | 1st Cook | 2nd Cook | 1st Cook | 2nd Cook | |
| P | 100 | | 4.3 | | H+ |
| P-1 | 80 | 20 | 4.7 | 7.7 | M+ |
| P-2 | 70 | 30 | 6.9 | 12.6 | O+ |
| P-3 | 60 | 40 | 8.3 | 12.8 | Q+ |
| P-4 | 50 | 50 | 14.2 | gelled | |

Resin P-4 did not contain sufficient fatty acid during the second cook to prevent gelation under these conditions.

*Example 16*

A series of resins were made with glycerol as the polyol. Each resin contained a total of:

Glycerol _____ 93 g. (1 mole).
Phthalic anhydride _____ 148 g. (1 mole).
Tall oil fatty acids _____ 201 g. (0.7 mole).

The temperatures involved were 230° C. for the first cook as well as the second cook. The viscosity was determined with a 50% solution in mineral spirits.

| Resin No. | Monobasic Acid, percent | | Acid No. | | Viscosity |
|---|---|---|---|---|---|
| | 1st Cook | 2nd Cook | 1st Cook | 2nd Cook | |
| Q | 100 | | 7.5 | | G |
| Q-1 | 80 | 20 | 5.6 | 6.9 | M |
| Q-2 | 70 | 30 | 7.9 | 6.3 | Q |
| Q-3 | 60 | 40 | 8.6 | 7.9 | Q |
| Q-4 | 50 | 50 | 8.0 | 9.2 | V+ |

*Example 17*

In this series of resins a mixture of pentaerythritol and ethylene glycol was used as the polyol and each resin contained:

Pentaerythritol (technical) _____ 78.2 g. (.54 mole).
Ethylene glycol _____ 28.5 g. (.46 mole).
Phthalic anhydride _____ 148 g. (1 mole).
Tall oil fatty acids _____ 197 g. (.685 mole).

The mole of polyol contains 0.54 mole of pentaerythritol and 0.46 mole of ethylene glycol and has an average hydroxyl value of $(0.54 \times 4)+(0.46 \times 2)$ or 3.08. As in most of the other series of resins, a resin was made by the total addition method for comparative purposes and other resins were made by the present partial addition process. All cooking temperatures were 230° C. and the viscosity was determined with a 50% resin solution in mineral spirits and a 40% solution in mineral spirits. The resins had the following properties:

| Resin No. | Monobasic Acid, percent | | Acid No. | | Viscosity | |
|---|---|---|---|---|---|---|
| | 1st Cook | 2nd Cook | 1st Cook | 2nd Cook | 50% | 40% |
| R | 100 | | 5.2 | | Z-3 | J |
| R-1 | 80 | 20 | 7.1 | 9.4 | Z-6 | W+ |
| R-2 | 70 | 30 | 5.8 | 12.4 | Z-7 | X- |
| R-3 | 60 | 40 | 8.3 | 13.7 | Z-6 | S- |

*Example 18*

Three resins were made, each containing the following starting materials:

Pentaerythritol (technical) _____ 66 g. (.45 mole).
Butylene glycol 1,3 _____ 50 g. (.55 mole).
Phthalic anhydride _____ 118.5 g. (.8 mole).
Tall oil fatty acids _____ 97 g. (.34 mole).

The mixed polyols have a functionality of a polyol containing $(.45 \times 4)+(.55 \times 2)$, that is, 2.9 hydroxyl groups. One resin was prepared by cooking all of the above materials at 210° C. Two resins were prepared by cooking the polyols, dibasic acid and 78 or 68.4 grams of the tall oil fatty acids at 210° C. Then, the remainder of the fatty acids were added in each instance and cooked at 215° C. The viscosity was determined in each instance with 50% solution in xylol. The three resins had the following viscosities:

| Resin No. | Monobasic Acid, percent | | Acid No. | | Viscosity |
|---|---|---|---|---|---|
| | 1st Cook | 2nd Cook | 1st Cook | 2nd Cook | |
| S | 100 | 0 | 7.9 | | S+ |
| S-1 | 80 | 20 | 7.3 | 14.6 | X- |
| S-2 | 70 | 30 | 4.5 | 13.5 | Z- |

*Example 19*

Two resins were prepared using 258 g. (1 mole) of dipentaerythritol, 193 (1.3 mole) of phthalic anhydride and a total of 632 g. (2.2 moles) of tall oil fatty acids. The first resin, resin T-1, was prepared by cooking all of these materials at 235° C. to an acid number of 8.6. The second resin, resin T-2, was prepared utilizing only 70%, 443 g., during the first cooking procedure to acid number 9.8 at 235° C. Then the remainder of the tall oil fatty acids were added and the mixture cooked at 230° C. to acid number 10.0. Resin T-1 had a viscosity of C at 60% in mineral spirits, while resin T-2 had a viscosity of H, 60% in mineral spirits.

*Example 20*

Each of these two resins were prepared from the following materials:

Dipentaerythritol _____ 258 g. (1 mole).
Phthalic anhydride _____ 207 g. (1.4 moles).
Tall oil fatty acids _____ 632 g. (2.2 moles).

Resin U-1 was prepared by cooking all of the materials at 235° C. until the acid number was 8.9. Resin U-2 was prepared by cooking all of the polyol and dibasic acid and 443 g. (70%) of the tall oil fatty acids at 235° C. to an acid number of 7.0. The remainder, 189 g. or 30%, of the tall oil fatty acids were added and this mixture cooked at 235° C. to an acid number of 6.2. When dissolved in mineral spirits to form 60% solutions, resin U-1 had a viscosity of M while resin U-2 had a viscosity of O.

*Example 21*

In all the foregoing examples, the monobasic acid component of the alkyd resin has been used in the acid form. When utilizing the present partial addition technique, that portion of the monobasic acid used in the first reaction or cooking procedure may be initially in the form of an oil which are glyceride esters. Obviously not all of the polyol portion can be initially in the form of an oil. The monobasic acid used during the second reaction must be in the acid form and an oil cannot be used for this purpose to achieve the same results.

When part of the fatty acid portion of the resin is initially in the form of an oil, the oil must be subjected to an alcoholysis reaction with the remainder of the polyol prior to reaction with the dibasic acid. As an illustrative example of this procedure, the following materials were mixed and then subjected to an alcoholysis reaction by heating at 230° C. for one hour under a blanket of inert gas and in the presence of 0.0203 gram of litharge which is an alcoholysis catalyst:

Grams
Soy bean oil _____ 216.3
Glycerol _____ 9.1
Pentaerythritol _____ 71

The soy bean oil used above contained 0.7 mole of soy bean oil fatty acids and 0.23 mole of glycerol. The added glycerol was 0.1 mole and the added pentaerythritol was .47 mole. Accordingly, the partial ester resulting from the alcoholysis reaction constituted a total of .8 mole of polyol partially esterified with a .7 mole of soy bean oil fatty acid.

The partial ester resulting from the alcoholysis reaction was mixed with 120 grams (.8 mole) of phthalic anhydride and cooked at 230° C. to an acid number of 8. Thereafter 83 grams of soy bean oil fatty acids was added and the mixture was cooked at 245° C. until it had an acid number of 3.7. In producing this alkyd resin 70% of the soy bean oil fatty acid was utilized during the first cooking procedure and 30% was utilized during the second cooking procedure. A 70% solution of the alkyd resin in mineral spirits had a viscosity of Z-5, while a 60% solution of the resin in mineral spirits had a viscosity of X.

The following examples, Examples 22 through 30, illustrate some of the uses of the alkyd resins prepared in accordance with the present partial addition technique, wherein these resins produce novel results ranging from improved results to entirely new results. Examples 22 through 25 illustrate various coating compositions such as paints and enamels prepared with the present resins. While in each of these last mentioned examples a particular alkyd resin is used, it is to be understood that in these coating compositions any of the foregoing alkyd resins could be used, although those resins containing an excess of polyol are preferred for such purposes. In all cases the resins prepared by the partial addition technique produce much better results than the corresponding resins prepared by the total addition technique. In general, these coating compositions will exhibit greater resistance to the permeation of water, greater resistance to ultraviolet light, and the dried coatings will be more flexible, have better heat stability and better color retention than the corresponding alkyd resin prepared by the total addition technique.

In addition, the coating compositions containing the present novel resins will exhibit better drying properties than those prepared by the total addition technique from the same ingredients. Resins prepared from tall oil fatty acids will dry at the faster rate normally exhibited by alkyd resins containing soy bean oil fatty acids.

*Example 22*

The following formulation illustrates a house paint prepared by mixing the following ingredients:

Pigment: Lbs.
　Titanium dioxide _____ 100
　Calcium sulfate-titanium dioxide _____ 100
　35% lead and zinc oxide _____ 150
　Color pigment _____ 75
　Whiting _____ 500
Vehicle:
　80% solution of alkyd resin _____ 500
　Aluminum octate _____ 4
　Methylethyl ketoxime (anti-skinning agent) ___ 1
　24% lead naphthenate drier _____ 8
　6% manganese naphthenate drier _____ 1

The alkyd resin utilized in the above formulation was a 30–70% partial addition resin prepared by mixing 148 parts of phthalic anhydride, 145 parts of technical pentaerythritol, and 158 parts of tall oil fatty acids, and cooking this mixture at 230° C. until it had an acid number of 10; thereafter, 364 parts of tall oil fatty acids were added and the mixture was cooked at 230° C. to an acid number of 5. This alkyd resin contained one mole of phthalic anhydride per mole of pentaerythritol and 1.8 moles of tall oil fatty acids per mole of pentaerythritol.

The above paint exhibited better brushability and was more resistant to water permeation and ultraviolet light than the house paint prepared utilizing an alkyd resin containing the same ingredients in the same proportions but prepared by the 100% addition technique where all of the materials were subjected to a single cook to a low acid number.

*Example 23*

This example illustrates a machinery enamel utilizing the alkyd resins of the present invention. The following formulation makes up approximately 100 gallons:

Pigment: Lbs.
　Titanium dioxide _____ 305
　Zinc oxide _____ 10
　Phthalocyanine blue _____ 6
Vehicle:
　Resin solution (80% resin and 20% solvent) __ 434
　Mineral spirits _____ 234
　Dipentene _____ 10
　6% cobalt naphthenate drier _____ 4
　24% lead naphthenate drier _____ 1.5
　5% calcium naphthenate drier _____ 1
　Dispersing agent _____ 5

The resin in the above formulation is the same as that utilized in the house paint formulation of Example 22.

*Example 24*

This example illustrates an architectural paint formulation which may be used for general purposes or as a trim paint for wood or metal. A 100 gallon formulation is as follows:

Pigment: Lbs.
　Titanium dioxide _____ 315
　Zinc oxide _____ 10
Vehicle:
　Alkyd resin _____ 470
　Mineral spirits _____ 128
　4% cobalt tallate _____ 2.5
　4% manganese tallate _____ 2.5
　16% lead tallate _____ 6

The above mentioned tallates are metal salts of tall oil fatty acids and are driers. The alkyd resin was the same as that used in the house paint formulation of Example 22.

*Example 25*

This example illustrates an automotive enamel containing the following ingredients:

Pigment: Lbs.
　Phthalocyanine blue _____ 1.5
　Titanium dioxide _____ 108
Vehicle:
　50% melamine-formaldehyde resin in solvent __ 50
　Alkyd resin, 50% solution in solvent _____ 410
　Xylol _____ 54
　High boiling petroleum _____ 3
　Naphtha _____ 106

The melamine-formaldehyde resin was used in the above formulation to increase the hardness of the coating. The alkyd resin was resin E-2 which is compatible with the melamine-formaldehyde resins. This alkyd resin produced a coating having greater flexibility, better adhesion and better heat stability and color resistance than obtained with comparative resin E.

*Example 26*

A plasticized polyvinyl chloride composition was prepared from the following materials:

Lbs.
Polyvinyl chloride resin (Geon 101 EP) _____ 100
Alkyd resin _____ 65
Barium-cadmium type stabilizer _____ 2

The above materials utilizing the adipic acid-trimethylolethane-caproic acid resin H-1 were milled on hot rolls for 5 minutes at 330° F. to form a homogeneous plasticized composition in sheet form. The resin H-2 could have been used as each of these resins will produce a plasticized composition having better resistance to migration and better resistance to soapy water and to oil than a similar composition prepared with resin H produced from the same ingredients by the total addition technique.

*Example 27*

This example illustrates the use of the alkyd resins of the present invention which are compatible with amino resins such as melamine-formaldehyde resins. For example, a baking-type enamel can be prepared by mixing the following ingredients:

| | Lbs. |
|---|---|
| Pigment (green) | 101 |
| Alkyd resin | 485 |
| Melamine-formaldehyde resin in solution | 122 |
| Xylol | 52 |
| Naphtha | 70 |

The melamine-formaldehyde solution contained 50% melamine-formaldehyde resin and the solvent portion consisted of 80% xylol and 20% butanol. A preferred alkyd resin in the above formulation is resin F-2 of Example 6. However, resins F-1 and F-3 can be used to produce better results than obtained with the comparative resin F. Alternatively and a very good resin for such use is resin E-2. Resins E-1 and E-3 also can be used for the same purpose and each of these will produce better results than resin E. The alkyd resin must be compatible with the melamine-formaldehyde resin and the alkyd resin also exerts a plasticizing effect on the melamine-formaldehyde resin which by itself will produce a brittle, hard coating. The above formulation can be applied to a surface, for example a metal surface, and baked at 300° F. The resulting coating will have better flexibility, better heat stability and better adhesion to the metal when used either as a prime or finish coat than will a similar enamel prepared with either resins E or F. For this purpose the preferred polyol is glycerine, trimethylolethane, trimethylolpropane or pentaerythritol.

*Example 28*

The example illustrates the use of the alkyd resins in a paint as a thixotropic or thickening agent to increase the viscosity, reduce sagging and impart better flexibility than is obtained with a similar formulation containing an alkyd resin produced from the same ingredients but not produced by the present partial addition technique. The following formulation is illustrative.

| | Lbs. |
|---|---|
| Pigment: | |
| Titanium dioxide | 275 |
| Calcium carbonate | 432 |
| Diatomaceous earth | 45 |
| Vehicle: | |
| Thixotropic resin | 18 |
| Normal alkyd resin solution | 453 |
| Mineral spirits | 50 |
| 6% cobalt drier | 6 |
| 24% lead drier | 8 |

The above driers were metal naphthenates. The normal alkyd solution was a solution containing 50% of a normal alkyd resin in mineral spirits. This normal alkyd resin was produced by cooking a mixture of 11.8 parts of pentaerythritol, 10.2 parts of ethylene glycol, 43.5 parts of tall oil fatty acids and 34.5 parts of phthalic anhydride at 180° C. for 2 hours, then at 245° C. for 5 hours to an acid number of 9. The thixotropic alkyd resin was resin O-2 described in Example 14. Alternatively, resin O-1 could have been used to obtain similar results. The use of this small amount of thixotropic alkyd greatly improved the above mentioned characteristics. In general, the thixotropic alkyds should contain an excess of polyol so that they have a relatively high, free hydroxyl content, preferably about one free hydroxyl per mole of polyol. The amount of monobasic acid per mole of polyol is preferably low so as to achieve these results and about 1 mole of dibasic acid is used per mole of polyol. In each of resins O-1 and O-2, the one mole of phthalic anhydride in theory esterifies ½ the hydroxyl groups present in the one mole of pentaerythritol. The tall oil fatty acids esterify 0.9 hydroxyl groups leaving in theory 1.1 mole of hydroxyl groups free or non-esterified for each mole of polyol.

*Example 29*

The present example illustrates the preparation of isocyanate foams having improved properties. First the following ingredients are thoroughly mixed:

| | Grams |
|---|---|
| Alkyd resin K | 100 |
| Water | 3 |
| Diethylethanolamine | .1 |
| Wetting agent | .2 |

After the above materials were thoroughly mixed and then mixed with 56 grams of a mixture containing 80% and 20%, respectively, of 2,4 and 2,6-toluene isocyanate. This mixture was poured into a mold in which the mixture foamed and then set to form a rigid foamed or cellular structure. Such a material is useful as an insulation or for other purposes. The use of the alkyd resin prepared by the partial addition technique of the present invention results in a foamed structure that is stronger, while having a lower density than a similar product obtained using an alkyd resin prepared from the same ingredients but produced by reacting all of the ingredients to a low acid number by the 100% addition method.

*Example 30*

The present example illustrates the use of an alkyd resin produced in accordance with the present invention as a surface active agent to increase the compatibility of a normal alkyd resin with a relatively poor solvent of limited compatibility. A normal alkyd resin was prepared by cooking all of the following ingredients at 180° C. for 2 hours, and then at 245° C. for 5 hours to an acid number of 9.

| | Parts |
|---|---|
| Pentaerythritol | 11.8 |
| Ethylene glycol | 10.2 |
| Tall oil fatty acids | 42.5 |
| Phthalic anhydride | 34.5 |

The above normal alkyd resin has limited compatibility with mineral spirits and while solutions containing 30% or 25% of resin are compatible, if such a solution is diluted with mineral spirits to a 20% resin content the resulting system is incompatible.

A solubilizing alkyd resin was prepared by reacting 148 grams of phthalic anhydride, 136 grams of pentaerythritol and 172 grams of tall oil fatty acids at 200° C. to an acid number of 10. Thereafter, 86 grams of tall oil fatty acids were added and the resulting mixture was reacted at 210° C. to an acid number slightly below 10. The addition of as little as 2 parts of this solubilizing alkyd resin to 98 parts of the normal alkyd resin mentioned above increases the compatibility of the normal alkyd, so that the alkyd resin is compatible with mineral spirits when diluted to 20% and even to 10% solids content, the solids content being the percentage of resin present by weight.

Alternatively, resin E-2 could have been used for this purpose.

I claim:

1. The process of producing alkyd resins comprising the steps of heating a polyhydric alcohol, a polybasic acid, and from 20% to 90% of the monobasic acid component of the resin at a temperature between 150° C.

and 290° C. until the reaction product has an acid number below 20, adding to the reaction product the remainder of the monobasic acid component of the resin as monobasic acid containing from 4 to 22 carbon atoms, and heating the resulting mixture at a temperature between 190° C. and 300° C. until the resulting alkyd resin has an acid number below 15.

2. The process of producing alkyd resins comprising the steps of heating a polyhydric alcohol, a polybasic acid, and from 40% to 85% of the monobasic acid component of the resin at a temperature between 150° C. and 290° C. until the reaction product has an acid number below 10, adding to the reaction product the remainder of the monobasic acid component of the resin as monobasic acid containing from 4 to 22 carbon atoms, and heating the resulting mixture at a temperature between 190° C. and 300° C. until the resulting alkyd resin has an acid number below 10.

3. The process of producing alkyd resins comprising the steps of heating an amount of polyhydric alcohol having an average functionality of at least 2.5 with from 0.6 to 2 moles of dibasic acid per mole of polyhydric alcohol and with at least 0.1 mole of a monobasic acid component per mole of polyhydric alcohol at a temperature between 150° C. and 290° C. until the reaction product has an acid number below 20 and heating said reaction product at a temperature between 190° C. and 300° C. with at least 0.1 mole of a monobasic acid containing from 4 to 22 carbon atoms per mole of polyhydric alcohol until the resulting alkyd resin has an acid number below 15, the amount of said polyhydric alcohol being in the range of from 5% less to 50% more than the amount required stoichiometrically for the complete esterification of the total amount of dibasic and monobasic acids.

4. The process of producing alkyd resins comprising the steps of heating an amount of polyhydric alcohol having an average functionality of at least 2.5 with from 0.6 to 1.7 moles of dibasic acid per mole of polyhydric alcohol and with at least 0.2 mole of a monobasic acid containing from 4 to 22 carbon atoms per mole of polyhydric alcohol at a temperature between 150° C. and 290° C. until the resulting reaction product has an acid number below 10 and heating said reaction product with at least 0.2 mole of said monobasic acid per mole of polyhydric alcohol at a temperature between 190° C. and 300° C. until the resulting alkyd resin has an acid number below 10, the amount of said polyhydric alcohol being in the range of from 5% less to 30% more than the amount required stoichiometrically for the complete esterification of the total amount of dibasic and monobasic acids, the amount of monobasic acid used in the first reaction constituting 40–85% and the amount of monobasic acid used in the second reaction constituting 15–60% of the total amount of monobasic acid.

5. The process of producing alkyd resins comprising the steps of heating a polyhydric alcohol selected from the group consisting of trimethylolethane, trimethylolpropane, pentaerythritol, dipentaerythritol, tripentaerythritol, glycerol, and mixtures thereof with from 0.6 to 1.7 moles of dibasic acid per mole of said polyhydric alcohol and with at least 0.2 mole of monobasic acid containing from 4 to 22 carbon atoms per mole of polyhydric alcohol at a temperature between 150° C. and 290° C. until the resulting reaction product has an acid number below 15 and heating said reaction product with at least 0.2 mole of said monobasic acid per mole of polyhydric alcohol at a temperature between 190° C. and 300° C. until the resulting alkyd resin has an acid number below 10, the amount of polyhydric alcohol being in the range of from 5% less to 50% more than the amount required stoichiometrically for the complete esterification of the total amount of dibasic and monobasic acids, and the amount of monobasic acid used in the first reaction constituting 20% to 90% and the amount of monobasic acid used in the second reaction constituting 10% to 80% of the total amount of monobasic acid.

6. The process as described in claim 5 wherein the monobasic acid is tall oil fatty acids.

7. The process as described in claim 5 wherein the polyhydric alcohol is trimethylolethane.

8. The process as described in claim 5 wherein the polyhydric alcohol is trimethyolpropane.

9. The process as described in claim 5 wherein the polyhydric alcohol is glycerol.

10. The process as claimed in claim 5 wherein the polyhydric alcohol is pentaerythritol.

11. The process as described in claim 5 wherein the polyhydric alcohol is dipentaerythritol.

12. An alkyd resin which is the polymeric reaction product of a polyhydric alcohol, a polybasic acid, and at least 0.1 mole of a monobasic acid component per mole of polyhydric alcohol heated at a temperature between 150° C. and 290° C. to form an intermediate product having an acid number below 20, said intermediate product thereafter being heated at a temperature between 190° C. and 300° C. with at least 0.1 mole of monobasic acid containing from 4 to 22 carbon atoms per mole of polyhydric alcohol to form a product having an acid number below 15.

13. An alkyd resin which is the polymeric reaction product of a polyhydric alcohol having a functionality greater than 2.5, from 0.6 to 1.7 moles of dibasic acid per mole of polyhydric acid, and at least 0.2 mole of monobasic acid containing 4 to 22 carbon atoms per mole of polyhydric alcohol heated at a temperature between 150° C. and 290° C. to form an intermediate product having an acid number below 15, said intermediate product thereafter being heated at a temperature between 190° C. and 300° C. with at least 0.2 mole of said monobasic acid per mole of polyhydric alcohol to form a product having an acid number below 10, the total amount of said monobasic and dibasic acids being from 50% to 105% of the amount required stoichiometrically for the complete esterification of the polyhydric alcohol.

14. An alkyd resin which is the polymeric reaction product of a polyhydric alcohol selected from the group consisting of trimethylolethane, trimethylolpropane, pentaerythritol, dipentaerythritol, tripentaerythritol, glycerol, and mixtures thereof, from 0.6 to 1.7 moles of dibasic acid per mole of said polyhydric alcohol, and at least 0.2 mole of monobasic acid containing 4 to 22 carbon atoms per mole of polyhydric alcohol heated at a temperature between 150° C. and 290° C. to form an intermediate product having an acid number below 15, said intermediate product thereafter being heated with at least 0.2 mole of said monobasic acid per mole of polyhydric alcohol to form a product having an acid number below 10, the total amount of said monobasic acid and dibasic acid being from 50% to 105% of the amount required stoichiometrically for the complete esterification of the polyhydric alcohol and the amount of monobasic acid used in the first reaction constituting 20% to 90% and the amount of monobasic acid used in the second reaction constituting 10% to 80% of the total amount of monobasic acid.

15. An alkyd resin as described in claim 14 wherein the monobasic acid is tall oil fatty acids.

16. An alkyd resin as described in claim 14 wherein the polyhydric alcohol is trimethylolethane.

17. An alkyd resin as described in claim 14 wherein the polyhydric alcohol is trimethylolpropane.

18. An alkyd resin as described in claim 14 wherein the polyhydric alcohol is glycerol.

19. An alkyd resin as described in claim 14 wherein the polyhydric alcohol is pentaerythritol.

20. An alkyd resin as described in claim 14 wherein the polyhydric alcohol is dipentaerythritol.

(References on following page)

References Cited in the file of this patent

UNITED STATES PATENTS

| | | |
|---|---|---|
| 1,975,246 | Zwilgmeyer | Oct. 2, 1934 |
| 2,028,908 | Hoffmann | Jan. 28, 1936 |
| 2,053,230 | Erkner | Sept. 1, 1936 |
| 2,151,312 | Ariotti | Mar. 21, 1939 |
| 2,385,256 | Britton et al. | Sept. 18, 1945 |
| 2,526,179 | West | Oct. 17, 1950 |
| 2,577,280 | Simon et al. | Dec. 4, 1951 |
| 2,691,006 | Flory | Oct. 5, 1954 |
| 2,764,565 | Hoppe et al. | Sept. 25, 1956 |
| 2,861,047 | Heckles | Nov. 18, 1958 |

FOREIGN PATENTS

| | | |
|---|---|---|
| 680,996 | Great Britain | Oct. 15, 1952 |

OTHER REFERENCES

Paint Technology, vol. XI, No. 131, November 1946, pages 429–430.